Dec. 31, 1957  B. F. VOGELAAR  2,818,125
HYDRAULIC DRIVING AND STEERING TRANSMISSION FOR VEHICLES
Filed April 18, 1956  5 Sheets-Sheet 1
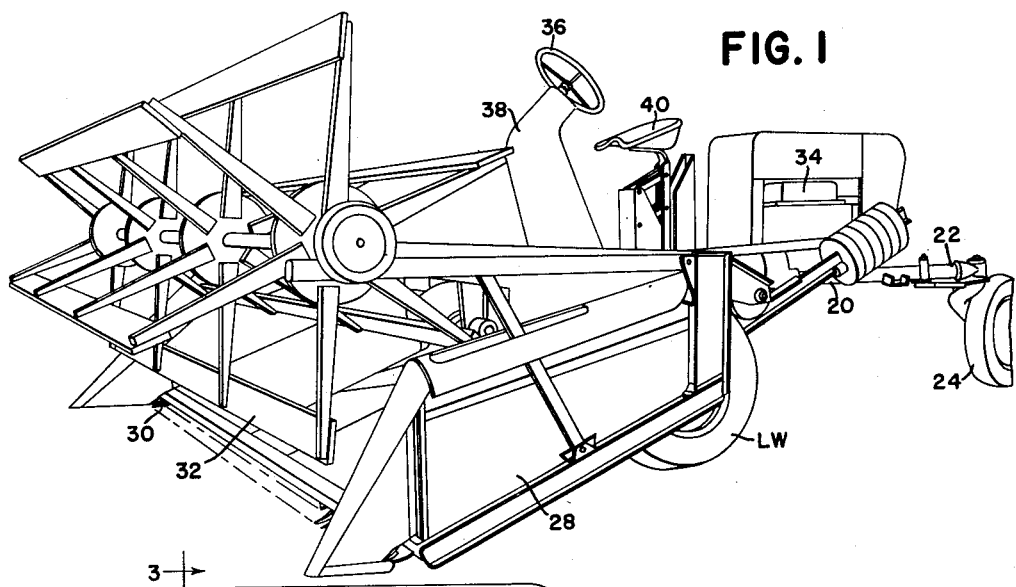
FIG. 1
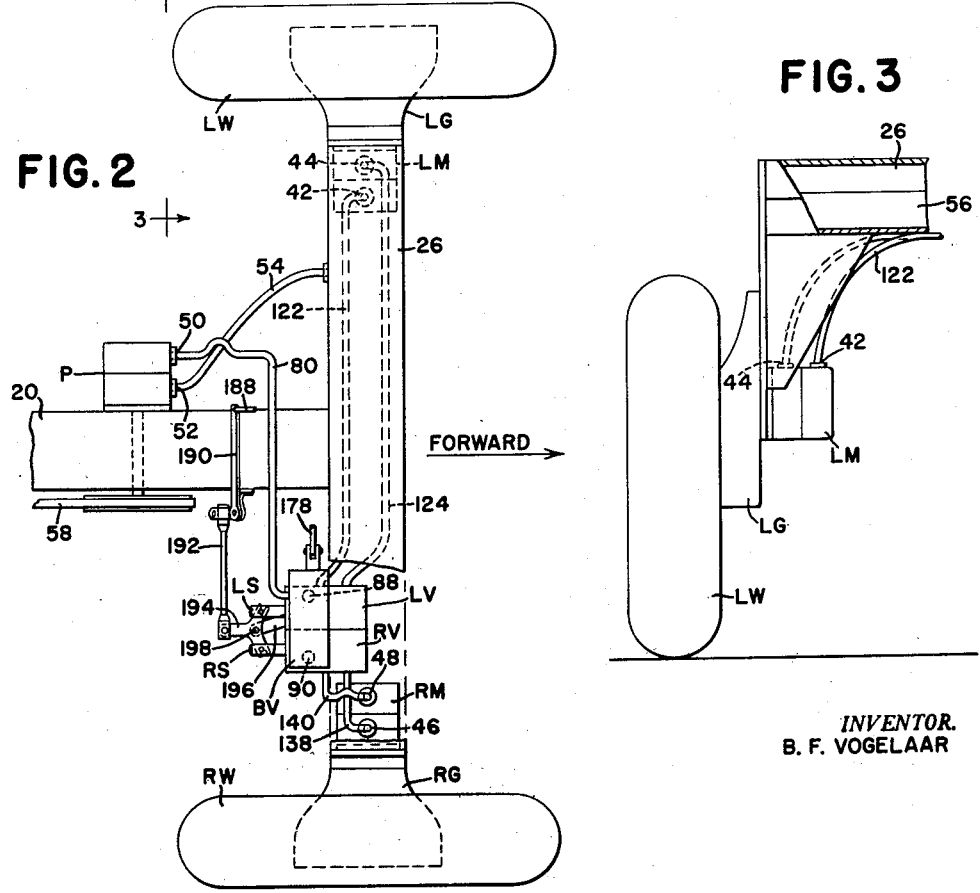
FIG. 2
FIG. 3
INVENTOR.
B. F. VOGELAAR Dec. 31, 1957  B. F. VOGELAAR  2,818,125
HYDRAULIC DRIVING AND STEERING TRANSMISSION FOR VEHICLES
Filed April 18, 1956  5 Sheets-Sheet 2
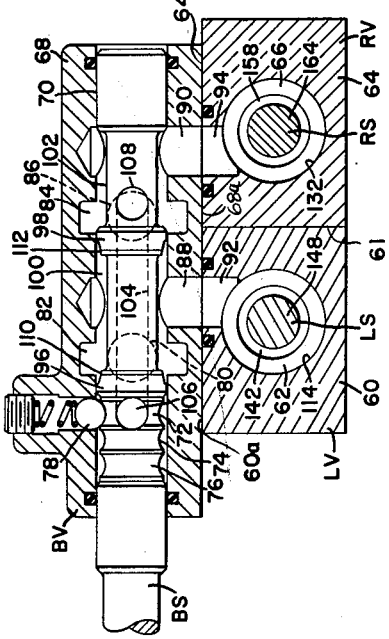
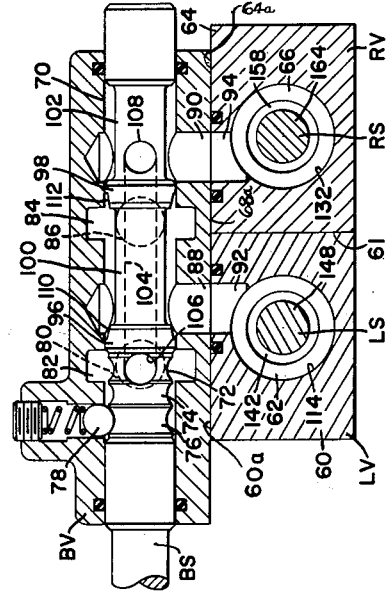
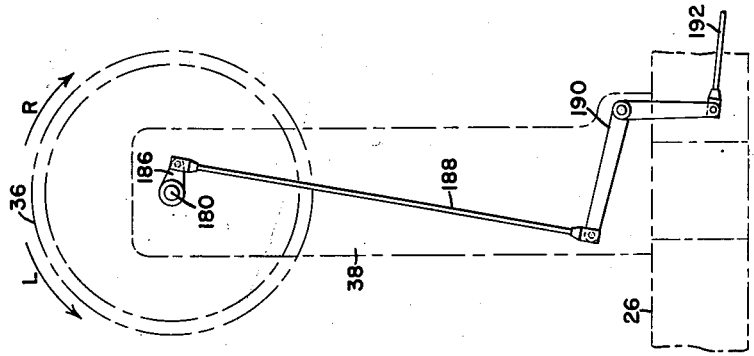
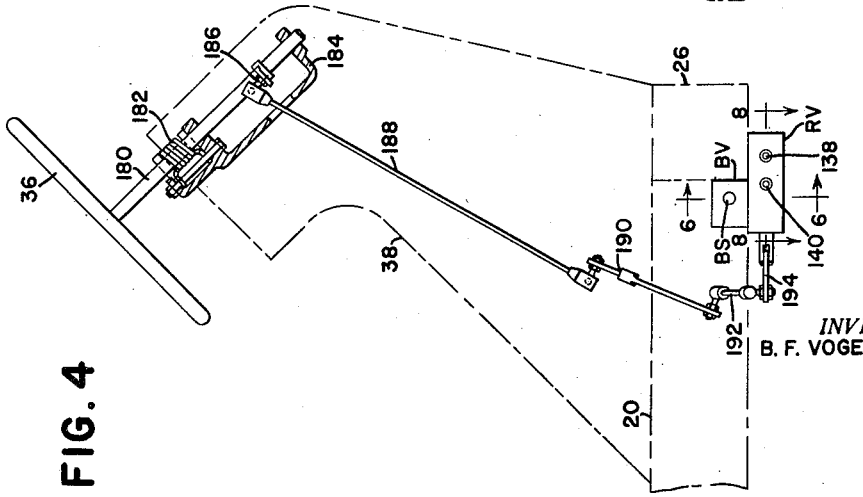
INVENTOR.
B. F. VOGELAAR

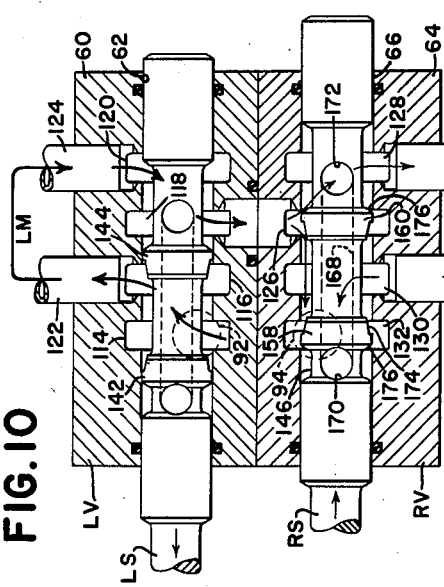

*INVENTOR.*
B. F. VOGELAAR

INVENTOR.
B. F. VOGELAAR

United States Patent Office 2,818,125
Patented Dec. 31, 1957

2,818,125
HYDRAULIC DRIVING AND STEERING TRANSMISSION FOR VEHICLES

Bernard F. Vogelaar, Moline, Ill., assignor to Deere & Company, Moline, Ill., a corporation of Illinois Application April 18, 1956, Serial No. 579,046

14 Claims. (Cl. 180—6.48)

This invention relates to a hydraulic transmission and primarily to a transmission including individual wheel motors connected to vehicle-supporting wheels and controlled to drive and steer the vehicle.

The invention has for a principal object the provision of an improved hydraulic transmission, preferably of the hydrostatic type, involving the control of a pair of laterally spaced wheels, wherein the direction of the vehicle is dependent upon the differences in speeds and directions of rotation of the wheels. It is an important object of the invention to utilize the hydraulic transmission in a vehicle for supporting a harvester, since it is in that field that driving and steering of the type covered herein offers the best solution to many problems.

The invention features the utilization of a control incorporating substantially identical valves, one for the right fluid motor and the other for the left fluid motor, the valves being arranged for operation in unison but in opposite directions. A primary object of the invention is to provide a hydraulic system using a series connection between the pressure source and the motors, so that the pressure source output is directed to one motor and the output of that motor is directed to the other motor, the motors being of uniform capacity so that when both are operated at the same speed and in the same direction, straight-ahead travel of the vehicle is obtainable. The invention incorporates means for shunting part of the fluid flow from one motor so as to obtain variations in speed of that motor relative to the full speed of the other motor. Other characteristics of the control include provision for reversing one motor while maintaining forward operation of the other, reversing one motor while stopping the other, and other variations that will appear as the description progresses.

The foregoing and other important objects and desirable features inherent in and encompassed by the invention will become apparent as a preferred embodiment is disclosed in detail in the ensuing specification and accompanying sheets of drawings, the several figures of which will be described immediately below.

Fig. 1 is a perspective view of a self-propelled windrow harvester, chosen as representative of a vehicle to which the steering and the driving system is applicable.

Fig. 2 is a fragmentary plan view, on an enlarged scale, of a forward portion of the vehicle, illustrating, somewhat schematically, the hydraulic circuit.

Fig. 3 is a section on the line 3—3 of Fig. 2.

Fig. 4 is a fragmentary view, partly in section and partly in phantom, illustrating part of the steering control means.

Fig. 5 is a rear elevation of the structure shown in Fig. 4.

Fig. 6 is a section on the line 6—6 of Fig. 4, drawn to an enlarged scale and showing the reversing valve.

Fig. 7 is a similar section showing the reversing valve in another position.

Fig. 8 is a section on the line 8—8 of Fig. 4, illustrating the right and left control valves in their straight-ahead positions.

Figs. 9, 10, and 11 are similar views, showing the valves in other positions, all with respect to the accomplishment of steering to the right.

Figure 14:
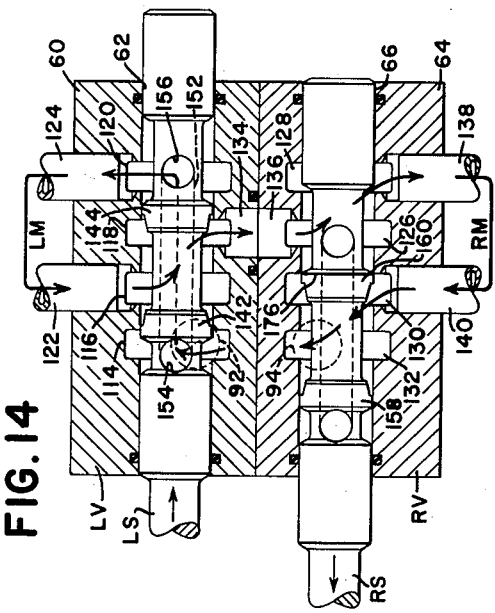
Figure 12:
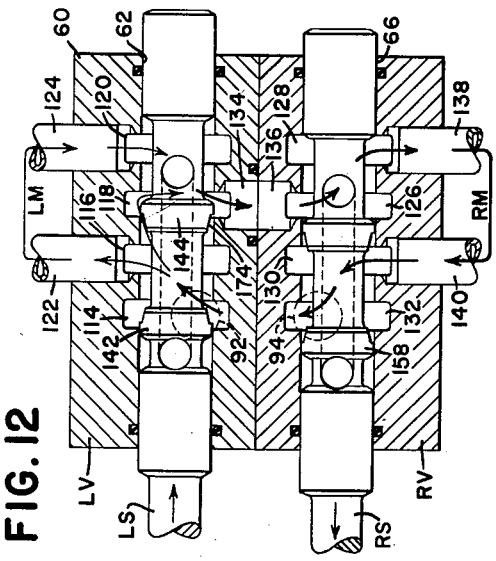
Figure 13:
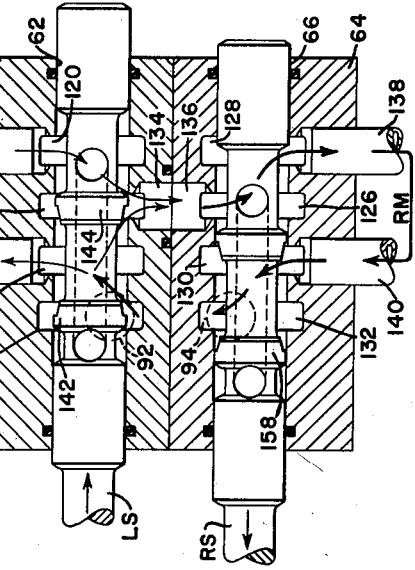

Figs. 12, 13 and 14 are similar views showing the valves in other positions relative to the accomplishment of steering to the left.

Figure 15:
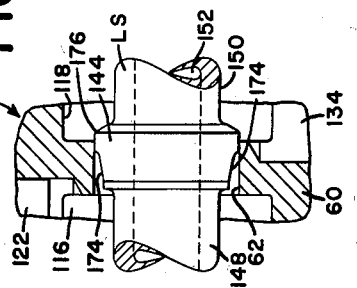

Fig. 15 is a fragmentary sectional view, on an enlarged scale, showing the construction of one of the shunt lands on a valve spool.

Figs. 16, 17, 18 and 19 are schematic views illustrating different types of right turns that can be accomplished, the dotted lines in each case illustrating the relative straight-ahead position of the vehicle.

The vehicle chosen for the purposes of illustration is a self-propelled windrow harvester, it being understood that this vehicle is representative only and that the principles of the invention can be applied to any comparable structure. This vehicle comprises a fore-and-aft main frame 20 carried at its rear end 22 on a single caster wheel 24 and carried at its front end by means of a transverse tubular front axle 26 and left and right traction wheels LW and RW. The normal straight-ahead direction of travel of the vehicle is indicated by the legend "forward" in Fig. 2. The expressions "left" and "right" are used here with reference to the position of an observer standing behind the machine and looking forwardly. The expression "wheels" is intended to embrace equivalents thereof. However, it should be clear that these expressions are used as terms of convenience and not of limitation, since reversal of the parts from side to side or front to rear is obviously not impossible.

The windrower machine comprises a conventional platform 28 suitably supported ahead of the wheels LW and RW and including a cutter bar 30 and a typical rotating reel 32. In the harvesting of crops by the windrow method, it is extremely important that the machine be capable of turning square corners, thereby eliminating uncut crops in the corners of the field. It is also desirable that the machine be capable of cutting closely along or even up to fences, hedge rows, etc. For these reasons, there is a substantially high degree of maneuverability required and on that basis the invention is illustrated as adapted to a windrowing machine.

The vehicle is powered in any suitable manner, as by an internal combustion engine 34 and is controlled by a steering wheel 36 appropriately supported at 38 ahead of an operator's station or seat 40.

The transverse tubular front axle 26 carries respectively at its left and right ends left and right reduction gear housings LG and RG, respectively, each of which contains appropriate gearing, not shown, for establishing a driving connection between the left wheel and a left fluid motor LM and a driving connection between the right wheel and a right fluid motor RM. The motors may be of any conventional rotary type and are therefor not shown in detail. The motor LM has a fluid inlet 42 and a fluid outlet 44. The right motor has a fluid inlet 46 and a fluid outlet 48.

The hydraulic transmission or circuit includes a pressure source P having a high or discharge side 50 and a low or intake side 52, the latter of which is connected by a line 54 to the hollow interior of the transverse front axle 26, which therefore affords a reservoir 56 (Fig. 3) forming part of the low side of the pressure source P. The high side or pump part of the pressure source is suitably driven from the vehicle engine 34, as by a belt 58 (Fig. 2), the belt representing either a constant speed or a variable speed drive, whereby the pump, in supplying the wheel motors LM and RM may also vary the straight-ahead or reverse travel speed of the machine.

The hydraulic circuit, in addition to the pressure source P and motors LM and RM, includes left and right valves LV and RV, respectively. These valves are best shown in detail in Figs. 8 through 14.

The left valve has a housing 60 provided with a substantially cylindrical valve bore 62 in which a left valve spool LS is mounted for axial shifting back and forth among several control positions to be presently described. The right valve is symmetrically constructed, having a housing 64 in which is formed an axial valve bore 66 for axially shiftably carrying a right valve spool RS. The two valves LV and RV are hereinafter referred to as control valves for the left and right motors LM and RM.

In general, the theory of operation of the hydraulic transmission is that the motors LM and RM are in series in the order named, the valves LV and RV being interposed in series between the two motors so that pump delivery flows first to the left valve, thence to the left motor, thence to the right valve, thence to the right motor and thence to the low side of the system. Therefore, in normal forward travel of the machine, the left motor is supplied directly from the pump and the left motor output is supplied to the right motor. It is, however, a feature of the invention that the direction of fluid flow can be reversed to obtain reverse travel of the machine, in which case the pump delivers directly to the right motor and thence to the left motor in series, the series connections being reversed as respects those generally described above. For the accomplishment of these results, the invention affords a reversing or back-up valve BV (Figs. 6 and 7). The reversing valve BV comprises a housing 68 mounted above and transversely of the valves LV and RV, and has an axially directed valve bore 70 in which a reversing valve spool BS is axially shiftable among forward, reverse, and neutral positions. Fig. 6 shows the valve spool BS in its forward position; Fig. 7 shows the valve spool in its reversing position. The spool is provided adjacent one end with three annular grooves 72, 74 and 76, which respectively constitute forward, neutral and reverse grooves. Housing-supported detent means 78 is selectively cooperative with any one of the grooves to maintain the selected position.

The discharge side 50 of the pressure source P is connected by a line 80 to an inlet or supply port 82 that intersects the valve bore 70 of the valve BV. A return port 84 in the valve BV intersects the valve bore 70 and is connected by a short line 86 (Figs. 6 and 7) to the reservoir 56 in the axle 26.

The valve bore 70 is further intersected by a pair of downwardly directed passages 88 and 90, which lead respectively to the left and right valves LV and RV. As shown in Figs. 6 and 7, the reversing valve BV is supported on top of and traverses the two valves LV and RV, and the connections 88 and 90 are made respectively to the valves LV and RV via corresponding registering passages 92 and 94 in the valves LV and RV. Specifically, the left and right valve housings lie side by side and abut each other in a common plane 61, in addition to which the left valve housing has a mounting surface 60a normal to the plane 61 and coplanar with a mounting surface 64a on the right valve housing 64 (Figs. 6 and 7); and the passages 92 and 94 respectively afford a left valve inlet and a right valve discharge line opening respectively at the coplanar surfaces 60a and 64a. The under surface 68a of the reversing valve housing 68 traverses and abuts the surfaces 60a and 64a and thus the three surfaces afford the mounting junction between the valve housing 60 and 64 and the valve housing 68. The passages 88 and 90 open at the third-mentioned surface 68a as supply and return lines, respectively, in register, respectively, with the left valve inlet 92 and the right valve discharge 94. With the valve spool BS set in the position of Fig. 6, fluid from the pressure source high side is supplied to the left valve bore 62 via the line 80 and passages 82, 88 and 92, the port 82 and passage 88 being connected across the reversing valve bore 70. Similarly, the right valve bore 66 is connected to the low side of the system via the passages 94 and 90, the reversing valve portion or groove 84 and the reservoir line 86, the port 84 and line 90 being connected across the reversing valve bore 70.

The spool BS has a pair of lands 96 and 98 and a pair of reduced portions 100 and 102. In addition, the spool BS has an axial passage 104 which opens radially at its opposite ends 106 and 108 respectively to the valve bore 70. Hence, when the valve spool BS is in its Fig. 6 position, the land 96 separates the radial passage 106 from the port 82 and the land 98 separates the return port 84 from that portion of the valve bore 70 intermediate the lands 96 and 98. Therefore, fluid entering at 80 must flow from 82 to 88 to 92 and thence to the left valve bore 62. Fluid returning from the right valve bore 66 must flow from 94 to 90, across the valve bore 70 to the port 84 and thence out through the exhaust line 86. Although returning fluid may enter the passage 104 at 108, it cannot escape at 106 because of the land 96.

When the valve spool BS is in its Fig. 7 position, the land 96 blocks communication between the port or groove 82 and the passage 88, and the land 98 locks communication between the port or groove 84 and the passage 90. Hence, fluid entering from 80 into 82 must enter the axial passage 104 at 106, flowing out at 108 into 90 and thence to 94 and into the right valve bore 66. Fluid returns from the left valve bore 62 via 92, 88, 70 and 84, to exit at 86 to the low side of the system.

From the description thus far, it will be seen that the passages 92 and 94 in the left and right valves LV and RV are alternately inlet or exhaust passages, depending upon the position of the reversing valve spool BS. These characteristics will appear in a better light in the subsequent detailed description of the two valves LV and RV. At this time, it should be noted that the reversing valve spool BS has a neutral position (not shown) in which the detent 78 engages the central or neutral groove 74. In this position of the valve spool BS, the land 96 is substantially centered in the groove or port 82 and the land 98 occupies the same position relative to the groove or port 84. Hence, fluid entering 82 from 80 may flow along the valve spool portion 100 and past the land 98 to the groove 84 and thence to the reservoir 56 via 86. In short, no fluid will be supplied effectively to the valves LV and RV.

The particular arrangement of the valves in Figs. 6 and 7, that is, with the reversing valve BS, traversing and mounted on the valves LV and RV via the previously described surfaces 60a, 64a and 68a is specifically novel; although, in its broadest aspects, the valves could be otherwise arranged. The particular arrangement shown lends itself admirably to manufacture, assembly and maintenance, since the bores and passages are conveniently designed for conventional coring and boring operations. The housings 60 and 64 of the left and right valves LV and RV are symmetrically constructed and are arranged side by side so that the bores 62 and 66 are parallel. A further feature is that the spools LS and RS are identical.

Before beginning the description of the right and left valves RV and LV, it should be noted that the lands 96 and 98 on the reversing spool BS are provided respectively with flats 110 and 112, the function of which is to make gradual the change from forward to reverse so as to avoid the imposition of shocks on the system.

For the purposes of the immediately following description of the valves LV and RV, reference will be had primarily to Fig. 8 and it will be assumed that the reversing valve spool BS is in its Fig. 6 position. As previously described, this connects the passages 88 and 92, respectively in the valve housings 68 and 60, so that the supply of fluid from the high side of the pressure source P is directed to the left valve spool bore 62. The passage 92 thus becomes an inlet line in constant communication with an annular groove or inlet port 114. The housing 60 has additional annular grooves or ports, spaced axially along the valve bore 62, and including a first motor port 116, a discharge port 118 and a second motor port 120. The port 116 is connected by a first left motor line 122 to the left motor inlet 42; and a second left motor line 124 constitutes a return conduit connecting the left motor outlet 44 and the right valve motor return port 120.

The right valve housing 64 has a plurality of axially spaced annular grooves or ports disposed along the bore and including an inlet 126, a first right motor port 128, a second right motor port 130 and a discharge port 132. Registering passages 134 and 136 cross-connect the valve housings 60 and 64 and provide a discharge line for the left valve port 118 and an inlet line for the right valve inlet port 126. The right valve motor port 128 is connected by a first right motor line 138 to the right motor inlet 46; and a second right motor line 140 connects the right motor outlet 48 to the right valve port 130.

The left spool LS has flow control means thereon including a pair of axially spaced annular lands 142 and 144, plus a plurality of intervening grooves or reduced portions 146, 148 and 150. In addition, the spool LS has further flow control means in the form of an axial passage 152 opening at its opposite ends as radial bores 154 and 156, respectively.

Since the valve spools LS and RS are identical, the right spool RS has similar lands and grooves. However, in the interests of maintaining the individual identities of the spools, the lands and grooves of the spool RS will be numbered differently. Hence, the spool RS includes a pair of lands 158 and 160, and a plurality of grooves 162, 164 and 166, in addition to which the spool RS includes an axial passage 168 opening radially at its opposite ends at 170 and 172.

Fig. 15 shows a fragmentary enlargement of that portion of the spool LS including the land 144 and the associated parts of the spool. The lands 142, 158 and 160 are similarly formed and the land 144 as shown in this figure should be taken as representative of all. Hence, each land, of which the land 144 is typical, has flow control portions provided by diametrically opposed flats 174, which constitute shunt valve means as will presently appear. In the interests of avoiding excess numerals in Figs. 8 through 14, the shunt portions on the respective lands, although illustrated, are identified only when the shunt portion is performing a shunt function, the numeral 174 being indicated in each case.

Another characteristic of each land is that at its side opposite the shunt flats 174, it has an annular cut-off edge 176 (Fig. 15). This numeral, for the reasons set forth above, will be applied only when the cut-off is functioning or about to function.

The reversing valve spool BS may be shifted among its several positions by any suitable control, a representative portion of which is shown at 178 in Fig. 2. It will be understood that normally the vehicle will be driven forwardly and consequently the valve spool BS will be set in the Fig. 6 position. When the vehicle is driven rearwardly, the Fig. 7 position will be achieved. There will be only a few occasions when the neutral position is needed.

The valve spools RS and LS are under control of steering control means, part of which is comprised by the steering wheel 36. As shown in Fig. 4, the steering wheel is keyed to the upper end of a rotatable shaft 180, which shaft is centered by a suitable centering spring 182 associated with a shaft-supporting housing 184. A steering arm 186 keyed to the shaft 180 is connected by a link 188 to an intermediate bell crank 190 appropriately pivoted on the support 38. The other arm of the bell crank is connected by a transverse link 192 to a Y-shaped lever 194 (Fig. 2). The valve housings 60 and 65 carry an appropriate support 196 on which the lever 194 is pivoted at 198. The arrangement is such that both valve spools LS and RS start together in their straight-ahead positions (Fig. 8) and are moved in unison but in opposite directions so that one moves in and the other moves out, as represented by the respective arrows in Figs. 9 through 14. Turning of the steering wheel 36 in a clockwise direction or to the right as indicated by the letter R in Fig. 5 will rock the bell crank 190 in a counterclockwise direction and will rock the lever 194 in a counterclockwise direction as seen in Fig. 2, thus moving the right spool RS in and the left spool LS out. Rotation of the steering wheel 36 in the opposite direction, as indicated by the letter L in Fig. 5, will reverse the in-out movement of the spools LS and RS.

*Operation*

The straight-ahead positions of the valve spools RS and LS (Fig. 8) have been previously described. In that description, it was assumed that the reversing valve spool BS is in its forward position (Fig. 6). Consequently, fluid under pressure is supplied to the left valve bore 62 at 92—114 and flows thence via 122 to the left motor LM and returns via 124—120—118—136—128 to the inlet of the right motor RM via the line 138, whence it returns to the low side of the pressure source via the line 140 and passages and ports 130—132—94—90—84—86. In short, in the Fig. 8 position, the lands 142 and 144 on the spool LS permit free pump delivery to the left motor. The land 144 permits free delivery from the left motor outlet to the right motor inlet past the right spool land 160. Likewise, the right spool lands 158 and 160 permit free return to the reservoir.

With the valves in their straight-ahead positions, the left and right motors are driven at the same speed and the vehicle travels straight ahead. Should it be desired to drive the vehicle in the reverse direction, the reversing valve spool BS is moved to its Fig. 7 position, which switches the pump output from the left motor inlet to the right motor outlet. Thereupon, the series connection is established in reverse to the right valve bore 66 via the reversing valve passages and ports 80—82—106—104—108—90, entering the right valve bore at 94—132 and flowing in a direction opposite to that indicated by the arrows in Fig. 8. In simple reversing of the vehicle in the manner just described, the control valves LS and RS are not disturbed. When it is desired to halt the vehicle completely, as for parking with the engine running, the reversing valve spool BS is set in its neutral position (intermediate the positions of Figs. 6 and 7). Again, the control valve spools LS and RS are not disturbed.

Figure 16:
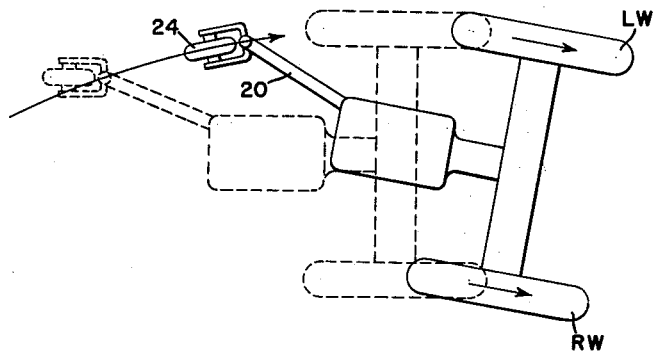

Let it now be assumed that the vehicle is being driven forwardly, with the reversing valve in its Fig. 6 position and the control valves as shown in Fig. 8. Fluid flow will be in series from the pressure source to the left motor, then to the right motor and then back to the pressure source, as indicated by the arrows in Fig. 8. If it is now desired to achieve a wide right turn as shown in Fig. 16, the steering wheel 36 is turned slightly to the right, causing the right spool RS to move in and the left LS to move out, as in Fig. 9. The over-all result is that the speed of rotation of the right motor and right wheel is slowed and that of the left motor and left wheel is retained. The vehicle will turn to the right in approximately the fashion illustrated in full lines in Fig. 16, the center of steering being generally at the point C, which will be found in Fig. 18.

It is a characteristic of the invention in this phase of operation that full pump delivery is maintained to the "outside" wheel, in this case the left wheel. This result is achieved by utilizing the shunt portions 174 on the right spool land 160, which portions control not the input to the left motor but the input to the right motor. This is best illustrated in Fig. 9 in which the shunted portion of fluid is represented as to flow by relatively lighter-weight arrows, illustrating the shunt flow from the inlet port 126 and along the valve bore 66 to the exhaust port 132. The main flow still follows the path from 126 to 128 and thence to and from the motor via the lines 138 and 140. In other words, the right wheel is traveling in the same direction but at a slower speed.

As will be seen from a comparison between Figs. 9 and 10, the volume of shunt flow may be varied, depending upon the angular increment of right hand steering of the wheel 36. In the positions of the valves shown in Fig. 10, the shunt flow is substantially predominant and only a minor portion of the flow is to the right hand wheel motor. In short, the cut-off edge 176 on the right spool land 160 is just about to cut-off the communication between the ports 126 and 128. As a practical matter, the right hand wheel at this time is virtually stopped, and will be stopped if there is substantial resistance to its forward travel, as would be presented by fairly rough ground as in a plowed field. Therefore, the valve setting of Fig. 10 would accomplish a steering result as illustrated in full lines in Fig. 17, wherein the arrow on the left wheel LW shows that that wheel is still rotating forwardly at full speed and the cross on the right wheel illustrates that that wheel is stopped or almost stopped. If it is assumed that the right wheel is absolutely stopped, then the steering pivot will be substantially about the point $C^1$ and there will be no fluid flow through the right motor. Fluid flow from 118 can follow the shunt path to the outlet 132 via the flat 174 on the right valve land 158 as well as a path past the cut-off 176 on the land 160, entering the axial passage 168 via 172 and leaving the axial passage at 170 to flow to the outlet 132.

As the change is made from Fig. 10 to Fig. 11, the cut-off 176 on the land 160 operates to separate the ports 126 and 128 so that fluid flow is switched to the other right motor line 130—140. At the same time, the flats 174 on the other land 158 are gradually diminishing fluid flow from the port 130 to the outlet 132 until the cylindrical portion of the land 158 to the left of the flats 174 (as seen in Figs. 10 and 11) completes the switch to reverse. Yet, the change is almost imperceptible and is provided to make the transition gradual and thereby to avoid the imposition of sudden shocks as the spools change position from Fig. 10 to Fig. 11.

From the description thus far, it will be seen that the right spool RS has a straight-ahead position as shown in Fig. 8, a first turn position including a wide-turn phase as shown in Fig. 9 and a short-turned phase as shown in Fig. 10 in which the shunt flow is increased. At the same time, while the right spool RS is moving in from the position of Fig. 8 to the position of Fig. 10, the left spool LS is moving out, but it is a characteristic of the instant valve design that this range of movement of the left spool is an idle range, and the left valve in effect "retains" its straight-ahead position even though the spool LS does move. In short, the left spool lands 142 and 144 have no practical effect on fluid flow, which is consistant with the theory that the "outside" (here the left wheel) receives the full pump displacement and shunting is accomplished on the opposite wheel. This will be clear from an examination of Figs. 16 and 17, in both of which cases the left wheel LW is rotating forwardly and at the same speed that it rotated during straight ahead travel. Stated otherwise, steering is accomplished in these two positions by decreasing the speed of the right wheel, bringing the speed to zero or almost zero in Fig. 17 by the valve positions of Fig. 10.

Ultimately, the left spool LS, in moving to the left, in the sequence described and illustrated in connection with Figures 8 through 11, will achieve a motor-stop position. However, prior to the achievement by the left spool of that position, the right spool will achieve a second right-turn position which may be termed a right-wheel-reversing position, represented in Fig. 11 and illustrated as to result in full lines in Fig. 18, wherein it will be seen that the type of turn accomplished is one generally about a pivot $C^2$, achieved by continuing to drive the left wheel forwardly while reversing the direction of rotation of the right wheel.

In this type of turn, the left and right valve spools LS and RS are in the positions of Fig. 11, from which it will be seen that the left motor still receives full pump displacement, since the spool LS still "retains" its straight-ahead position and the land 144 has not materially affected the fluid flow from 114 to 116. However, and looking now at the right spool RS, it will be seen that the land 160 completely blocks communication from 126 to 128 and instead switches the left motor output via 118 from 126 to 130, thereby reversing the direction of fluid flow so that the right motor line 140 now becomes an inlet line and the right motor line 138 becomes a return line, thereupon reversing the direction of rotation of the right motor. Fluid now returns from the opposite side of the right motor via the line 138 to the port 128 and enters the axial passage 168 at 172, escaping from that passage at 170 to the port 132 and thence to the reservoir via 94.

Figure 19:
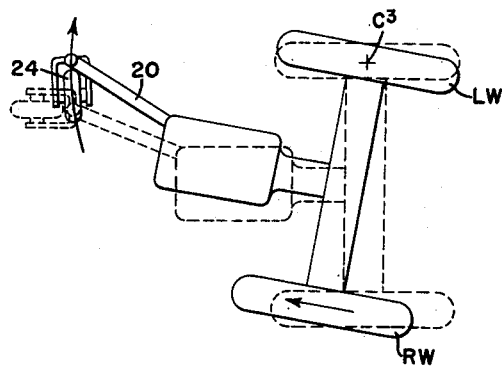

A still further condition involving relative positions of the spools LS and RS is attainable. That is the third or motor-stop position of the spool LS, which occurs subsequent to the position of Fig. 11 and while the spool RS "retains" its second-turn position as in that figure. In the motor-stop position, the cut-off edge 176 on the left spool land 144 moves past or to the left of its Fig. 11 position, thus communicating the port 116 with the port 118 across the land 144. The fluid will now flow from 92—114 to 116—118, because this is the path of least resistance; although, the path of flow to the left motor is still open. However, because of ground resistances, the fluid will take the path 92—114—116—118 and will thence flow to the right motor line 140 rather than to the right motor line 138, because the land 160 still maintains its Fig. 11 blockade as respects 126—128. Therefore, as shown in Fig. 19, the left wheel will stop and the machine will pivot generally about a pivot point $C^3$ and the right wheel will be driven in a reverse direction.

As will be seen, the maneuverability of the vehicle is substantial and a variety of types of turns can be accomplished.

As will be apparent from Figs. 12, 13 and 14, similar turns can be accomplished to the left. In general, Fig. 12 corresponds to Fig. 9 but shows a left turn, Fig. 13 corresponds to Fig. 10 but shows a left turn, and Fig. 14 corresponds to Fig. 11 and shows a left turn.

In a wide left turn phase as accomplished by the valve setting of Fig. 12, the left spool LS is moved inwardly to a first-turn position and the right spool RS, although moved outwardly, in effect retains its straight-ahead position. Again, full pump displacement is delivered to the "outside" wheel, here the right wheel, and the "inside" or, here, the left wheel, is slowed. This will be apparent from the direction and relative weights of the arrows indicating the paths of fluid flow. Main fluid flow to the left motor inlet is from 92—114—116—122, but a portion of this fluid is shunted past the shunt portion 174 on the left spool land 144. The shunted fluid is added to the registering passages 134—136 and therefore complements that portion of fluid returning from the left motor outlet via 124—120, so that the total volume to the right motor is full pump displacement. The right spool, in moving outwardly, moves through what may be termed an idle range, just as did the left spool in the right turn positions of Figs. 9 through 11.

Figure 17:
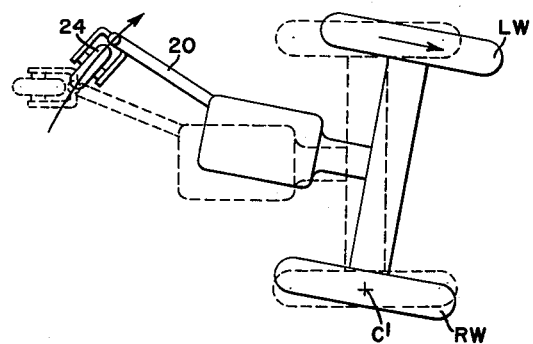

Fig. 13 shows the positions of the valve spools LS and RS in a short left turn phase of the first-turn position of the spool LS, producing a result comparable to but just the opposite of Fig. 17. In this figure, the spool RS, although moved outwardly, again in effect retains its straight-ahead position and the left spool LS has been moved farther inwardly to increase the volume of the shunted fluid, whereupon the left hand wheel stops or virtually stops, depending upon the ground resistance. Full pump displacement is still delivered to the right hand wheel. The difference between the shunt effect in Figs. 9 and 12 or between Figs. 10 and 13 is that in Figs. 9 and 10 the shunt occurs on the "far" motor, whereas in Figs. 12 and 13 the shunt occurs on the "near" motor. That is to say, in Figs. 9 and 10, return to the right motor is effected by the shunt, whereas in Figs. 12 and 13, initial delivery to the left hand motor is effected by the shunt. However, the relative volumes delivered to the motors are the same in both cases.

Figure 18:
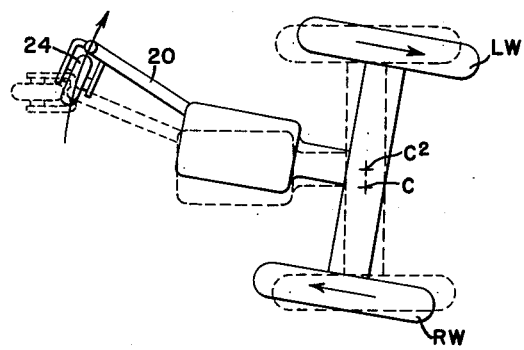

Fig. 14 shows valve settings for accomplishing a sharp or pivot turn comparable to but just the reverse of Fig. 18, the general result being accomplished consisting in reversing the direction of the left hand wheel while maintaining forward rotation of the right hand wheel.

The left spool LS in Fig. 14 is in its second or sharp-turn or motor-reversing position, whereas the right spool RS has just about completed its idle range and is ready to achieve its right-motor-stop position. In this stage of the valve settings, the land 142 now blocks communication between the left valve ports 114 and 116, but at the same time registers the passage bore 154 with the inlet port 114, whereupon fluid flow is from 92 to 154, via 152 and 156 to 120 and thence via 124 to the reverse side of the left motor. It follows, therefore, that what was formerly the left motor inlet is now the outlet and is connected via 122 to the left valve port 116. When the land 142 blocks communication between the ports or grooves 114 and 116, the other land 144 opens communication between the grooves 116 and 118, whereupon the return from 122—116 is now exposed via 134 and 136 to the right valve inlet 126, whereupon fluid flows to the right motor inlet via the line 138, returning from the right motor via 140 to 94 through 130—132. In Fig. 14, the cut-off edge 176 on the land 160 is just about ready to open communication between the grooves 126 and 130. Hence, upon further movement of the valve spools LS and RS in the respective directions indicated, the right wheel will be stopped and the left wheel will continue to be driven in reverse, to obtain a reverse turn just the opposite of that in Fig. 19.

The foregoing has set forth the general principles of the invention, many of them in considerable detail, thereby elaborating the feature of the invention residing in the shunt principle to obtain decrease in speed of one motor while maintaining full speed of the other, in addition to that characteristic of the valves which enables stopping of one motor while reversing of the other or, selectively, reversing of one motor while continuing to drive the other in a forward direction, all of which characteristics are available regardless of whether the vehicle is operated forwardly or in reverse. As originally pointed out, the features of the invention are of fundamental importance in a vehicle such as a windrow harvester in which a substantially high degree of maneuverability is desired. It will be understood, however, that the transmission and its control are applicable to other vehicles.

The hydraulic transmission has a significant advantage over mechanical steering and driving mechanisms in the control of the vehicle on rolling terrain. For example, if the vehicle is running downhill, a mechanical system tends to free-wheel angle this characteristic is aggravated when steering is attempted while on the incline, because steering involves a combination of de-clutching and braking, according to the direction of steering. For example, on a right turn, the right wheel will be de-clutched and will thus tend to overrun the left wheel, which is braked by the engine, until the right wheel is itself braked by the steering control. In the transition between de-clutching and braking, the vehicle tends to run to the left. The operator of course attempts to check this tendency and oversteers to the right. As a practical matter, the situation may become dangerous to an unskilled operator. This disadvantage is not present in the hydraulic system because any tendency toward free-wheeling is counter-acted by a braking effect achieved by (on a right turn for example) a valve position just beyond that of Fig. 10, in which case fluid flow from the right motor line 140 will be throttled by the flats 174 on the land 150. Of course, further valve movement to the Fig. 11 position will reverse the right motor. In either event, any tendency of the hydraulically equipped machine to run to the left is offset by a further turn to the right (or vice versa) which is the natural and therefore the safest course for the operator.

Features of the invention not categorically enumerated herein will undoubtedly occur to those versed in the art, as will many modifications and alterations in the preferred embodiment shown, all of which may be achieved without departure from the spirit and scope of the invention.

What is claimed is:

1. In a vehicle having left and right wheels: a hydraulic driving and steering system comprising rotary left and right fluid motors drivingly connected respectively to the left and right wheels; a fluid pressure source including a pump and a reservoir; a left valve having an inlet line connected to the pump, first and second left motor lines connected to opposite sides of the left motor, and a discharge line; a right valve having an inlet line connected to the left valve discharge line, first and second right motor lines connected to opposite sides of the right motor and a discharge line connected to the reservoir; said valves being simultaneously settable in straight-ahead conditions in which fluid flow connections are established in the left valve between the inlet and first left motor lines and between the second left motor and left valve discharge lines and in the right valve between the inlet and first motor lines and between the second right motor and discharge lines, whereby the motors are fluid-driven forwardly in series and at the same speed; either valve being selectively settable in a first turn condition, while the other valve retains its straight ahead condition, and each valve having a shunt flow portion effective, when the respective valve is in its first turn condition, to shunt part of the inlet flow to the respective discharge line for decreasing the speed of the respective motor while retaining the speed and forward direction of the other motor; and actuator means for operating the valves.

2. The invention defined in claim 1, in which: the shunt flow portion of each valve is so constructed that when the particular valve is in its first turn condition said portion is selectively variably effective through said first turn condition to selectively vary the volume of shunt flow and thereby to selectively vary the speed of the respective motor.

3. The invention defined in claim 1, in which: either valve is additionally selectively settable in a second turn condition, while the other valve occupies its straight-ahead condition, to interchange the respective motor lines with the respective inlet and discharge lines for reversing the direction of fluid flow through the associated motor and thereby reversing the associated wheel while retaining the speed and forward direction of the other motor and wheel.

4. The invention defined in claim 3, in which: either valve is additionally selectively settable in a third turn position, while the other valve is in its second turn position, for interconnecting the respective inlet and discharge lines and thus by-passing the associated motor to stop said motor while retaining the speed and reverse direction of the other motor.

5. The invention defined in claim 1, including: a forward-reverse valve having a pump line and a reservoir line, a left valve supply line connected to the left valve inlet line and a right valve return line connected to the right valve discharge line, said forward-reverse valve being selectively settable in a forward position connecting the pump and left valve supply lines and the right valve return and reservoir lines, or in a reverse position connecting the pump and right valve return lines and the left valve supply and reservoir lines.

6. In a vehicle having left and right wheels: a hydraulic driving and steering system comprising rotary left and right fluid motors drivingly connected respectively to the left and right wheels; a fluid pressure source including a pump and a reservoir; a left valve including a housing provided with a valve bore and a plurality of bore-intersecting fluid lines comprising an inlet line connected to the pump, first and second left motor lines connected to opposite sides of the left motor, and a discharge line; a right valve including a housing provided with a valve bore and a plurality of bore-intersecting fluid lines comprising an inlet line connected to the left valve discharge line, first and second right motor lines connected to opposite sides of the right motor and a discharge line connected to the reservoir; said valves respectively including left and right valve spools shiftably carried in the respective valve bores and being simultaneously settable in straight-ahead conditions in which fluid flow connections are established in the left valve between the inlet and first left motor lines and between the second left motor and left valve discharge lines and in the right valve between the inlet and first motor lines and between the second right motor and discharge lines, whereby the motors are fluid-driven forwardly in series and at the same speed; either valve spool being selectively settable in a first turn condition, while the other valve spool retains its straight-ahead condition, and each valve having a shunt flow portion effective, when the respective valve is in its first turn condition, to shunt part of the inlet flow to the respective discharge line for decreasing the speed of the respective motor while retaining the speed and forward direction of the other motor; and actuator means for operating the valve spools.

7. The invention defined in claim 6, in which: either valve spool is additionally selectively settable in a second turn condition, while the other valve spool occupies its straight-ahead condition, to interchange the respective motor lines with the respective inlet and discharge lines for reversing the direction of fluid flow through the associated motor and thereby reversing the associated wheel while retaining the speed and forward direction of the other motor and wheel.

8. The invention defined in claim 7, in which: either valve spool is additionally selectively settable in a third turn position, while the other valve spool is in its second turn position, for interconnecting the respective inlet and discharge lines and thus by-passing the associated motor to stop said motor while retaining the speed and reverse directions of the other motor.

9. The invention defined in claim 6, including: a forward-reverse valve having a pump line and a reservoir line, a left valve supply line connected to the left valve inlet line and a right valve return line connected to the right valve discharge line, said forward-reverse valve being selectively settable in a forward position connecting the pump and left valve supply lines and the right valve return and reservoir lines, or in a reverse position connecting the pump and right valve return lines and the left valve supply and reservoir lines.

10. The invention defined in claim 9, in which: the left and right valve housings are side-by-side, with the left valve discharge line in register with the right valve inlet; the left valve housing has a first mounting surface to which the left valve inlet line opens and the right valve housing has a second mounting surface to which the right valve discharge line opens, said mounting surfaces being coplanar; and the forward reverse valve includes a housing having a third mounting surface traversing and abutting the first and second mounting surfaces, the supply and return lines of the forward-reverse valve opening at said third surface respectively in register with the left valve inlet and right valve discharge lines.

11. In a vehicle having left and right wheels: a hydraulic driving and steering system comprising rotary left and right fluid motors drivingly connected respectively to the left and right wheels; a fluid pressure source including a pump and a reservoir; a left valve including a housing provided with a valve bore and a plurality of bore-intersecting fluid lines comprising an inlet line connected to the pump, first and second left motor lines connected to opposite sides of the left motor, and a discharge line; a right valve including a housing alongside the left valve housing and provided with a valve bore paralleling the left valve bore and further having a plurality of bore-intersecting fluid lines comprising an inlet line connected to the left valve discharge line, first and second right motor lines connected to opposite sides of the right motor and a discharge line connected to the reservoir; means interconnecting the valve spools for movement in unison but in opposite axial directions so that both valve spools start in straight-ahead conditions in which fluid flow connections are established in the left valve between the inlet and first left motor lines and between the second left motor and left valve discharge lines and in the right valve between the inlet and first motor lines and between the second right motor and discharge lines, whereby the motors are fluid-driven forwardly in series and at the same speed; either valve spool being selectively movable in one direction to a first turn position while the other valve spool moves in the opposite direction, and each valve spool having flow-control means thereon so constructed that whichever valve spool moves in said opposite direction is still effective to retain its straight-ahead condition; each valve spool having a shunt flow portion so constructed that whichever valve spool occupies said first turn position is effective to shunt part of the inlet flow to the respective discharge line for decreasing the speed of the respective motor while retaining the speed and forward direction of the other motor; and actuator means connected to the interconnecting means for operating the valve spools.

12. The invention defined in claim 11, in which: either valve spool is additionally selectively movable in said one direction to a motor-reversing position while the other valve spool continues in said opposite direction, said flow-control means on each valve being so constructed that the valve spool that continues in said opposite direction remains further effective to retain its straight-ahead condition, each valve spool having reverse flow means thereon so constructed that whichever valve spool occupies said motor-reversing position is effective to reverse the direction of fluid flow through the associated motor for thereby reversing the associated wheel while retaining the speed and forward direction of the other motor and wheel.

13. The invention defined in claim 12, in which: either valve spool is further selectively movable in said one direction to retain its motor-reversing effect and the other valve spool continues in the opposite direction and departs from its straight-ahead condition to a motor-by-pass condition, each valve spool having by-pass means effective when the respective valve is in said motor-by-pass condition to interconnect the respective valve inlet and discharge lines for by-passing the associated motor so as to stop said motor while the valve spool in the motor-reversing position retains the speed and reverse direction of its motor.

14. In a vehicle having left and right wheels: a hydraulic driving and steering system comprising rotary left and right fluid motors drivingly connected respectively to the left and right wheels; a fluid pressure source including a pump and a reservoir; a left control valve connected between the pump and one side of the left motor; a right control valve connected between the other side of the left motor and one side of the right motor; a return line connecting the other side of the right motor to the reservoir; said valves being simultaneously settable in straight-ahead conditions to direct the pump discharge to one side of the left motor via the left valve and to direct the left motor discharge to the corresponding side of the right motor via the right valve; either of said valves being reversible, while the other valve occupies its straight-ahead condition, to switch the respective discharge to the opposite side of the associated motor for reversing said motor while retaining the speed and direction of the other motor; and right and left shunt valve means associated respectively with the right and left control valves and each having neutral and shunt conditions, said right shunt valve means being operative, while the left control valve occupies its straight-ahead condition and the left shunt valve means retains its neutral condition, to shunt part of the left motor discharge to the reservoir so as to slow the right motor while retaining the speed and direction of the left motor, and said left shunt valve means being operative, while the right control valve and right shunt valve means respectively retain their straight-ahead and neutral conditions, to shunt part of the pump discharge away from said one side of the left motor and to said one side of the right motor so as to retain the speed and direction of the right motor while slowing the left motor.

References Cited in the file of this patent

UNITED STATES PATENTS

| | | |
|---|---|---|
| 2,361,098 | Higby | Oct. 24, 1944 |
| 2,771,958 | Ball | Nov. 27, 1956 |